US009024975B2

(12) United States Patent
Dubs et al.

(10) Patent No.: US 9,024,975 B2
(45) Date of Patent: May 5, 2015

(54) REPURPOSED SCREEN REAL ESTATE FOR ENHANCED TABLET FUNCTION (75) Inventors: Justin Tyler Dubs, Durham, NC (US); Harriss Christopher Neil Ganey, Cary, NC (US); Aaron Michael Stewart, Raleigh, NC (US); Jennifer Greenwood Zawacki, Hillsboro, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1808 days.

(21) Appl. No.: 12/145,727

(22) Filed: Jun. 25, 2008

(65) Prior Publication Data

US 2009/0322789 A1  Dec. 31, 2009

(51) Int. Cl.
  *G09G 5/32* (2006.01)
  *G09G 5/14* (2006.01)
  *G06F 1/16* (2006.01)

(52) U.S. Cl.
  CPC ............... *G09G 5/14* (2013.01); *G06F 1/1616* (2013.01); *G06F 1/1647* (2013.01); *G06F 1/1692* (2013.01); *H04M 2250/16* (2013.01)

(58) Field of Classification Search
  CPC ....... G09G 5/14; G06F 1/1616; G06F 1/1647; G06F 1/1692; H04M 2250/16
  USPC ........... 345/1.1, 157, 530, 545, 649; 455/566, 455/575.1
  See application file for complete search history.

(56) References Cited

U.S. PATENT DOCUMENTS

| | | | |
|---|---|---|---|
| 7,158,154 B2 * | 1/2007 | Kim et al. ...................... | 345/649 |
| 2002/0124152 A1 * | 9/2002 | Arndt et al. ....................... | 712/1 |
| 2004/0257341 A1 * | 12/2004 | Bear et al. ...................... | 345/157 |
| 2005/0078086 A1 * | 4/2005 | Grams et al. .................. | 345/158 |
| 2005/0125570 A1 * | 6/2005 | Olodort et al. .................. | 710/15 |
| 2005/0179653 A1 * | 8/2005 | Hamon ......................... | 345/156 |
| 2006/0183505 A1 * | 8/2006 | Willrich ........................ | 455/566 |
| 2006/0253705 A1 * | 11/2006 | Roberts et al. ................ | 713/168 |
| 2007/0018992 A1 * | 1/2007 | Wong ............................ | 345/545 |
| 2007/0182663 A1 * | 8/2007 | Biech ............................ | 345/1.1 |
| 2007/0268200 A1 * | 11/2007 | Fuller et al. .................... | 345/1.1 |
| 2008/0045280 A1 * | 2/2008 | Hawkins et al. ........... | 455/575.1 |
| 2008/0301675 A1 * | 12/2008 | Cromer et al. .................... | 718/1 |
| 2009/0156303 A1 * | 6/2009 | Kiely et al. ..................... | 463/29 |
| 2009/0179865 A1 * | 7/2009 | Kumar .......................... | 345/173 |

\* cited by examiner

*Primary Examiner* — Jin-Cheng Wang
(74) *Attorney, Agent, or Firm* — John L. Rogitz; John M. Rogitz (57) ABSTRACT A system, method, and program product is provided that automatically allocates a display screen into two areas when the display screen is pivoted from a landscape orientation to a portrait orientation. A hypervisor receives a pivot request (e.g., from a user) to pivot the display screen from a landscape orientation to a portrait orientation. When the display screen is oriented in the landscape orientation, a primary operating system displays its data on the display screen. Upon reception of the pivot request, the hypervisor allocates the display screen into a primary display area and a secondary display area. The hypervisor then displays data originating from the primary operating system in the primary display area and displays data originating from a second operating system in the secondary display area.

19 Claims, 8 Drawing Sheets

REPURPOSED SCREEN REAL ESTATE FOR ENHANCED TABLET FUNCTION

BACKGROUND OF THE INVENTION

1. Technical Field

The present invention relates to a system, method, and program product that operate to repurpose widescreen tablet screen real estate. More particularly, the present invention operates to provide a second display area when the screen is pivoted into a portrait orientation.

2. Description of the Related Art

Tablet computer systems (tablet PCs) are mobile computer systems often utilizing screens that allow a user to interact with the system by touching the screen using a stylus, digital pen, or fingertip instead of, or in addition to, a keyboard or a mouse. Tablet PCs are often popular in situations where use of a normal notebook computer is impractical, unwieldy, or otherwise does not provide the functionality needed by the user.

One challenge of tablet PCs is the screen size is generally smaller than that used with other types of computer systems. To address this challenge, developers have begun manufacturing widescreen displays with display sizes roughly 10.5 inches by 6.0 inches that can display video from 4:3 (standard aspect ratio) sources. While widescreen displays work well at displaying video when the display is in "landscape mode" (with the width being the larger dimension than the height), these displays often waste valuable screen space when displaying documents in "portrait mode."

SUMMARY

It has been discovered that the aforementioned challenges are resolved using a system, method and computer program product that automatically allocates a display screen into two areas when the display screen is pivoted from a landscape orientation to a portrait orientation. A hypervisor receives a pivot request (e.g., from a user) to pivot the display screen from a landscape orientation to a portrait orientation. When the display screen is oriented in the landscape orientation, a primary operating system displays its data on the display screen. Upon reception of the pivot request, the hypervisor allocates the display screen into a primary display area and a secondary display area. The hypervisor then displays data originating from the primary operating system in the primary display area and displays data originating from a second operating system in the secondary display area.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

Certain specific details are set forth in the following description and figures to provide a thorough understanding of various embodiments of the invention. Certain well-known details often associated with computing and software technology are not set forth in the following disclosure, however, to avoid unnecessarily obscuring the various embodiments of the invention. Further, those of ordinary skill in the relevant art will understand that they can practice other embodiments of the invention without one or more of the details described below. Finally, while various methods are described with reference to steps and sequences in the following disclosure, the description as such is for providing a clear implementation of embodiments of the invention, and the steps and sequences of steps should not be taken as required to practice this invention. Instead, the following is intended to provide a detailed description of an example of the invention and should not be taken to be limiting of the invention itself. Rather, any number of variations may fall within the scope of the invention, which is defined by the claims that follow the description.

The following detailed description will generally follow the summary of the invention, as set forth above, further explaining and expanding the definitions of the various aspects and embodiments of the invention as necessary. To this end, this detailed description first sets forth a computing environment in FIG. 1 that is suitable to implement the software and/or hardware techniques associated with the invention. A networked environment is illustrated in FIG. 2 as an extension of the basic computing environment, to emphasize that modern computing techniques can be performed across multiple discrete devices.

Figure 1:
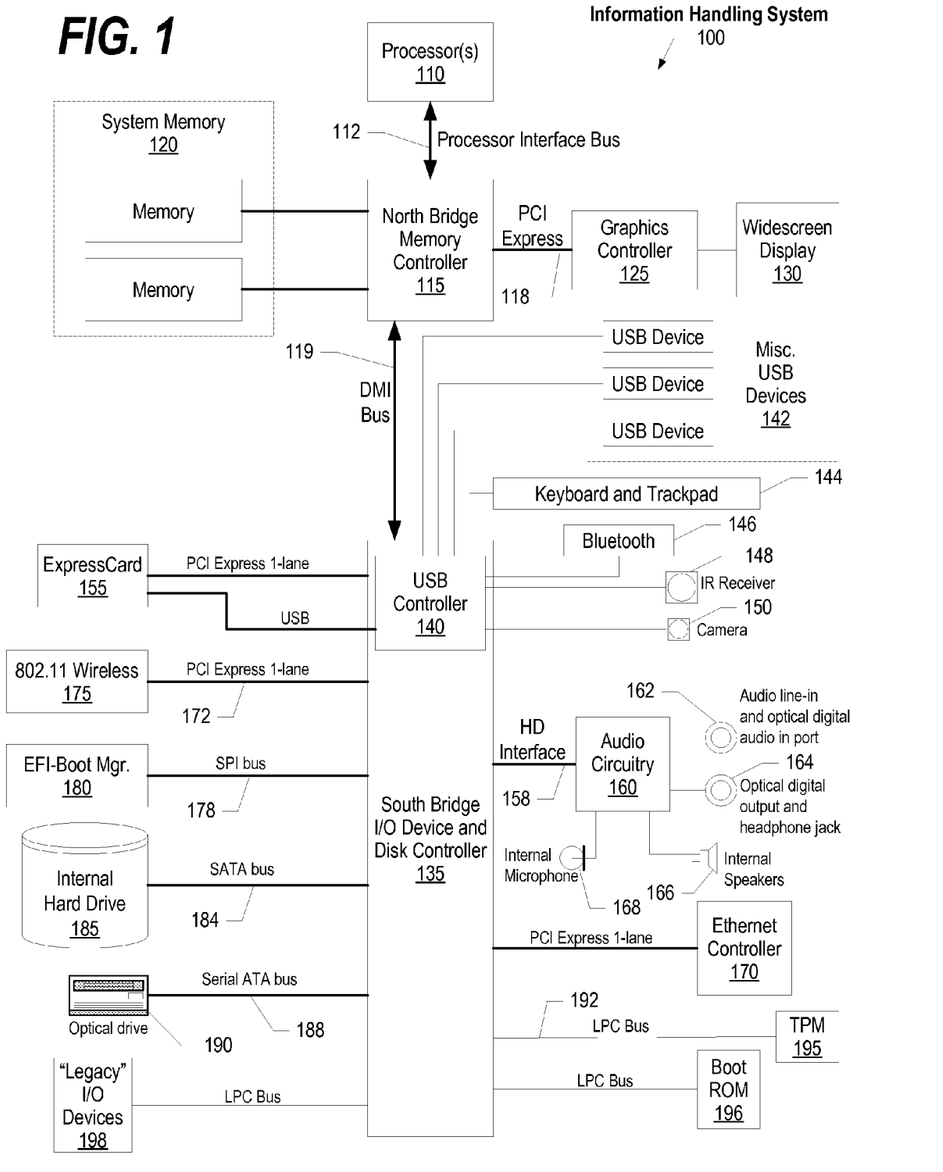
FIG. 1 is a block diagram of a data processing system in which the methods described herein can be implemented.
Figure 2:
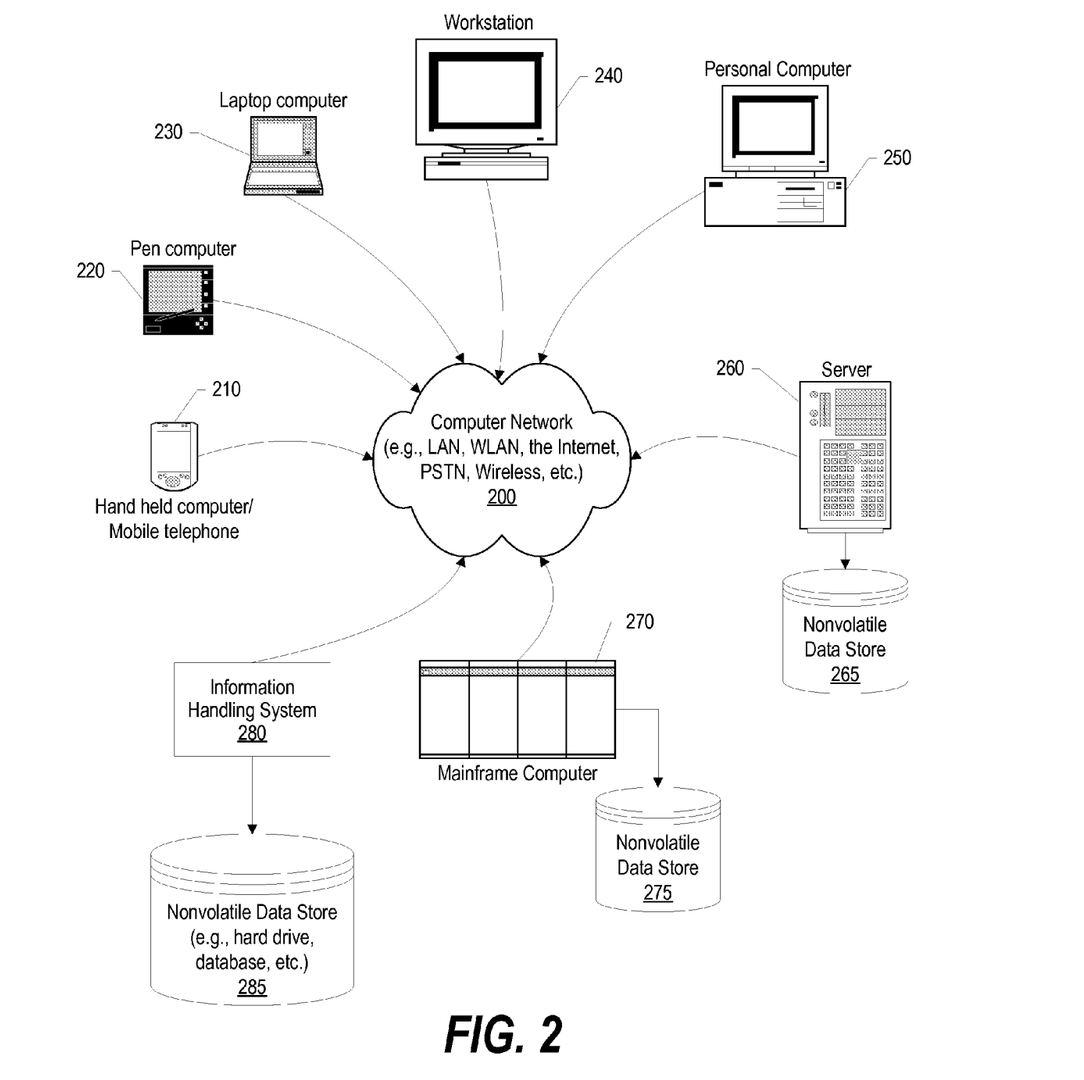
FIG. 2 provides an extension of the information handling system environment shown in FIG. 1 to illustrate that the methods described herein can be performed on a wide variety of information handling systems which operate in a networked environment.

FIG. 1 illustrates information handling system 100 which is a simplified example of a computer system capable of performing the computing operations described herein. Information handling system 100 includes one or more processors 110 which is coupled to processor interface bus 112. Processor interface bus 112 connects processors 110 to Northbridge 115, which is also known as the Memory Controller Hub (MCH). Northbridge 115 is connected to system memory 120 and provides a means for processor(s) 110 to access the system memory. Graphics controller 125 is also connected to Northbridge 115. In one embodiment, PCI Express bus 118 is used to connect Northbridge 115 to graphics controller 125. Graphics controller 125 is connected to display device 130, such as a computer monitor.

Northbridge 115 and Southbridge 135 are connected to each other using bus 119. In one embodiment, the bus is a Direct Media Interface (DMI) bus that transfers data at high speeds in each direction between Northbridge 115 and Southbridge 135. In another embodiment, a Peripheral Component Interconnect (PCI) bus is used to connect the Northbridge and the Southbridge. Southbridge 135, also known as the I/O Controller Hub (ICH) is a chip that generally implements capabilities that operate at slower speeds than the capabilities provided by the Northbridge. Southbridge 135 typically provides various busses used to connect various components. These busses can include PCI and PCI Express busses, an ISA bus, a System Management Bus (SMBus or SMB), a Low Pin Count (LPC) bus. The LPC bus is often used to connect low-bandwidth devices, such as boot ROM 196 and "legacy" I/O devices (using a "super I/O" chip). The "legacy" I/O devices (198) can include serial and parallel ports, keyboard, mouse, floppy disk controller. The LPC bus is also used to connect Southbridge 135 to Trusted Platform Module (TPM) 195. Other components often included in Southbridge 135 include a Direct Memory Access (DMA) controller, a Programmable Interrupt Controller (PIC), a storage device controller, which connects Southbridge 135 to nonvolatile storage device 300 such as a hybrid hard disk drive, using bus 184.

ExpressCard 155 is a slot used to connect hot-pluggable devices to the information handling system. ExpressCard 155 supports both PCI Express and USB connectivity as it is connected to Southbridge 135 using both the Universal Serial Bus (USB) the PCI Express bus. Southbridge 135 includes USB Controller 140 that provides USB connectivity to devices that connect to the USB. These devices include webcam (camera) 150, infrared (IR) receiver 148, Bluetooth device 146 which provides for wireless personal area networks (PANs), keyboard and trackpad 144, and other miscellaneous USB connected devices 142, such as a mouse, removable nonvolatile storage device 145, modems, network cards, ISDN connectors, fax, printers, USB hubs, and many other types of USB connected devices. While removable nonvolatile storage device 145 is shown as a USB-connected device, removable nonvolatile storage device 145 could be connected using a different interface, such as a Firewire interface, etc. Removable storage device 145 can also be a hybrid disk drive, such as hybrid disk drive 300 shown in FIGS. 3-6.

Wireless Local Area Network (LAN) device 175 is connected to Southbridge 135 via the PCI or PCI Express bus 172. LAN device 175 typically implements one of the IEEE 802.11 standards of over-the-air modulation techniques that all use the same protocol to wireless communicate between information handling system 100 and another computer system or device. Optical storage device 190 is connected to Southbridge 135 using Serial ATA (SATA) bus 188. Serial ATA adapters and devices communicate over a high-speed serial link. The Serial ATA bus is also used to connect Southbridge 135 to other forms of storage devices, such as hard disk drives. Audio circuitry 160, such as a sound card, is connected to Southbridge 135 via bus 158. Audio circuitry 160 is used to provide functionality such as audio line-in and optical digital audio in port 162, optical digital output and headphone jack 164, internal speakers 166, and internal microphone 168. Ethernet controller 170 is connected to Southbridge 135 using a bus, such as the PCI or PCI Express bus. Ethernet controller 170 is used to connect information handling system 100 with a computer network, such as a Local Area Network (LAN), the Internet, and other public and private computer networks.

While FIG. 1 shows one information handling system, an information handling system may take many forms. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

The Trusted Platform Module (TPM 195) shown in FIG. 1 and described herein to provide security functions is but one example of a hardware security module (HSM). Therefore, the TPM described and claimed herein includes any type of HSM including, but not limited to, hardware security devices that conform to the Trusted Computing Groups (TCG) standard, and entitled "Trusted Platform Module (TPM) Specification Version 1.2." The TPM is a hardware security subsystem that may be incorporated into any number of information handling systems, such as those outlined in FIG. 2.

FIG. 2 provides an extension of the information handling system environment shown in FIG. 1 to illustrate that the methods described herein can be performed on a wide variety of information handling systems which operate in a networked environment. Types of information handling systems range from small handheld devices, such as handheld computer/mobile telephone 210 to large mainframe systems, such as mainframe computer 270. Examples of handheld computer 210 include personal digital assistants (PDAs), personal entertainment devices, such as MP3 players, portable televisions, and compact disc players. Other examples of information handling systems include pen, or tablet, computer 220, laptop, or notebook, computer 230, workstation 240, personal computer system 250, and server 260. Other types of information handling systems that are not individually shown in FIG. 2 are represented by information handling system 280. As shown, the various information handling systems can be networked together using computer network 200. Types of computer network that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling system include nonvolatile data stores, such as hard drives and/or nonvolatile memory. Some of the information handling systems shown in FIG. 2 are depicted with separate nonvolatile data stores (server 260 is shown with nonvolatile data store 265, mainframe computer 270 is shown with nonvolatile data store 275, and information handling system 280 is shown with nonvolatile data store 285). The nonvolatile data store can be a component that is external to the various information handling systems or can be internal to one of the information handling systems. In addition, removable nonvolatile storage device 145 can be shared amongst two or more information handling systems using various techniques, such as connecting the removable nonvolatile storage device 145 to a USB port or other connector of the information handling systems.

Figure 3:
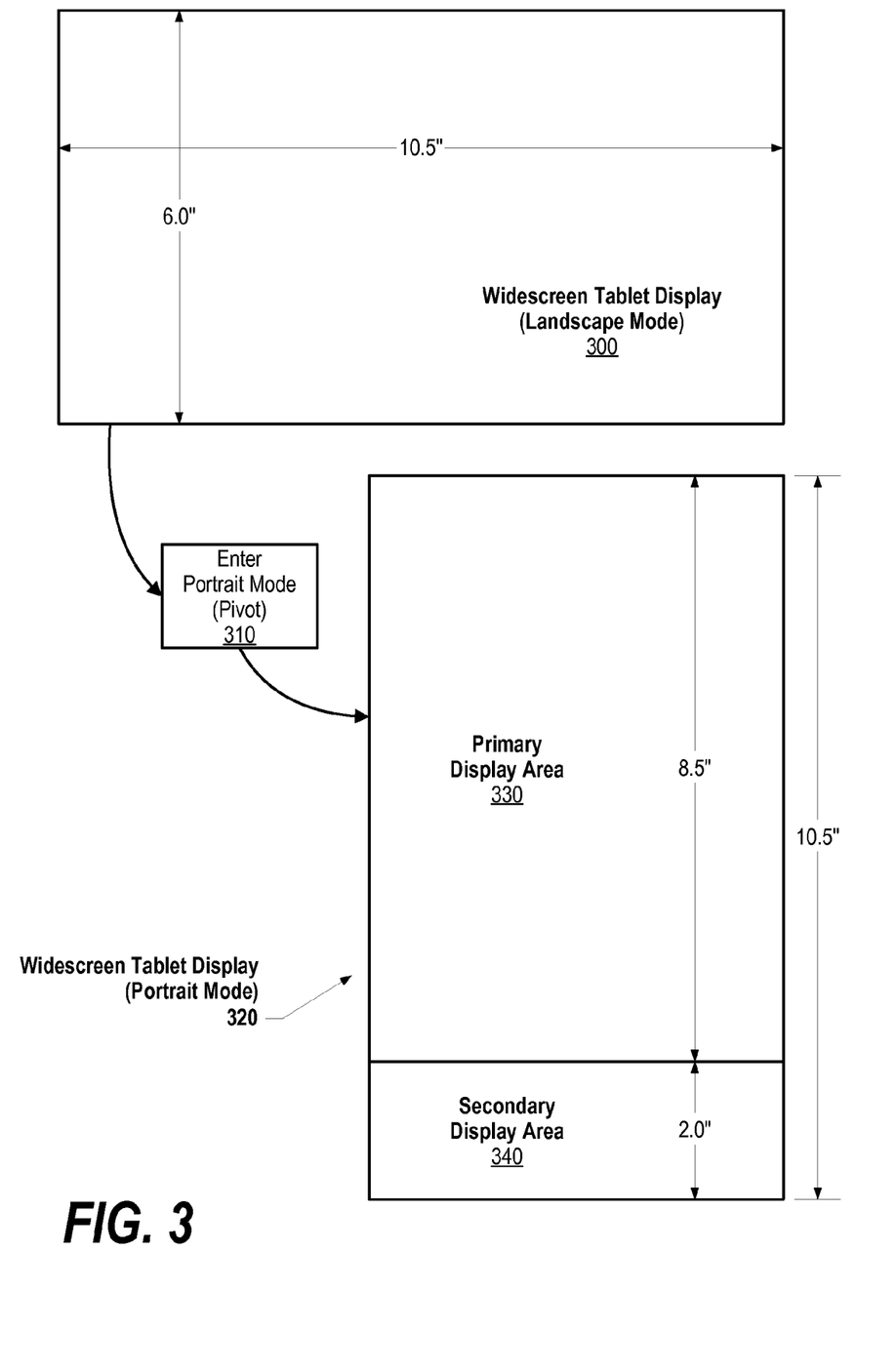
FIG. 3 is a diagram showing a screen configuration resulting when a widescreen tablet display is pivoted into a portrait orientation.

FIG. 3 is a diagram showing a screen configuration resulting when a widescreen tablet display is pivoted into a portrait orientation. Widescreen tablet display 300 depicts the display in landscape mode. In one embodiment, while in a landscape orientation, the width of the display is 10.5 inches and the height is 6.0 inches. Process 310 is performed to pivot the display into portrait mode 320. When the widescreen tablet display is in a portrait orientation, the width of the display is the same as the height of the display when the display was in landscape mode (e.g., 6.0 inches). Likewise, the overall height of the display when the display is in portrait orientation is the same as the width of the display when the display was in landscape mode (e.g., 10.5 inches). As shown, when the widescreen tablet display enters portrait mode, the screen is divided into two display areas—primary display area 330 and secondary display area 340. In one embodiment, the primary display area is 8.5 inches in height by 6.0 inches in width, while the secondary display area is 2.0 inches in height by 6.0 inches in width with the secondary display area either appearing above or below the primary display area. In this manner, the aspect ration of the primary display area is roughly the same as a standard sheet of paper (e.g., A4 paper, etc.), so that a visual representation of a standard sheet of paper can appear in the primary display area with little wasted space at any of the margins (e.g., little wasted space above, below, left, or right of the visual representation of the sheet of paper). Secondary display area 340 is created automatically when the display is pivoted into portrait mode from landscape mode. In one embodiment, secondary display area 340 is used by a secondary operating system while primary display area 330 is used by the primary operating system running on the tablet computer system.

A hypervisor is used to manage the display screen and assign the primary and secondary display areas to the primary and secondary operating systems. As used herein, a "secondary operating system" includes both a second guest operating system that is running under a hypervisor process as well as a hypervisor routine or process that runs in the hypervisor but is not part of the primary operating system.

Figure 4:
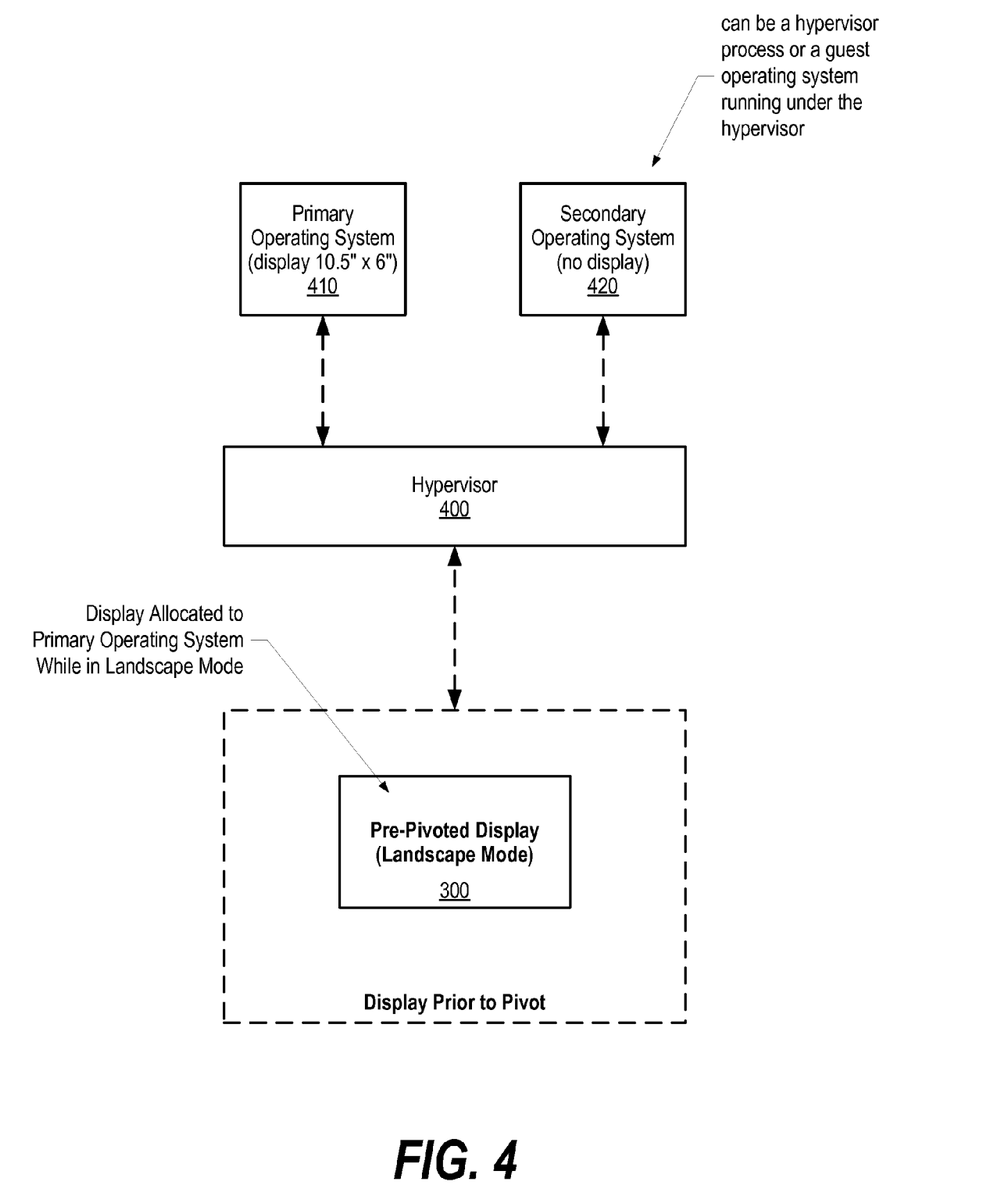
FIG. 4 is a diagram showing interaction between a hypervisor and two operating systems when utilizing a tablet display that pivoted into a landscape mode orientation.

FIG. 4 is a diagram showing interaction between a hypervisor and two operating systems when utilizing a tablet display that pivoted into a landscape mode orientation. When the widescreen tablet display is oriented in landscape mode 300, hypervisor 400 allocates the entire display area to primary operating system 410 (e.g., a display area that is 10.5 inches wide and 6.0 inches high) and does not allocate any screen area to secondary operating system 420. As previously mentioned, in one embodiment, secondary operating system 420 is a guest operating system running under hypervisor 400 while, in another embodiment, secondary operating system 420 is a routine or process running within hypervisor 400.

Figure 5:
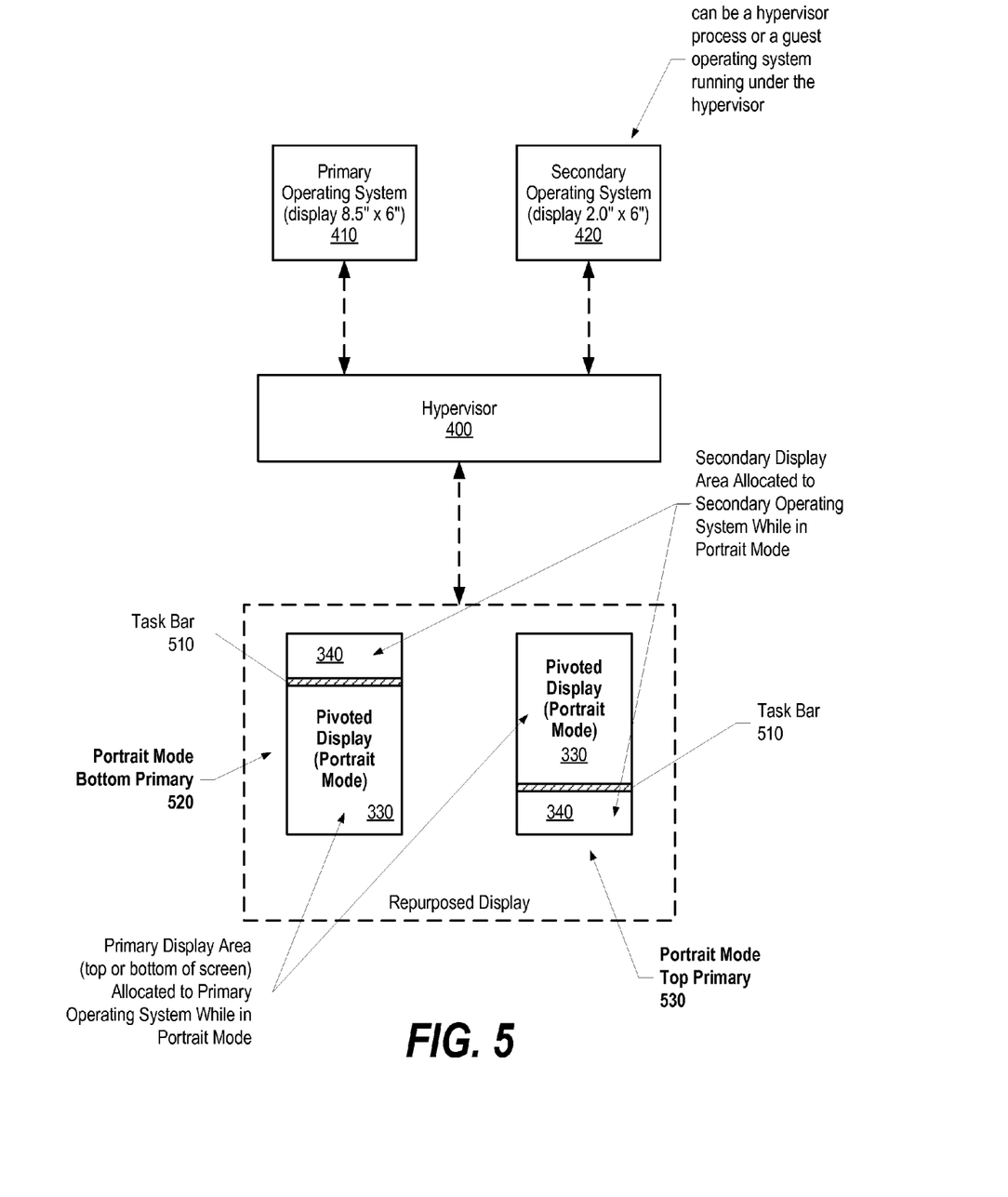
FIG. 5 is a diagram showing interaction between the hypervisor and the two operating systems when utilizing the tablet display is pivoted into a portrait mode orientation with an additional secondary display area utilized by the second operating system.

FIG. 5 is a diagram showing interaction between the hypervisor and the two operating systems when utilizing the tablet display is pivoted into a portrait mode orientation with an additional secondary display area utilized by the second operating system. When the widescreen tablet display is pivoted into portrait mode, hypervisor 400 allocates the display, now oriented in portrait mode, amongst primary operating system 410 and secondary operating system 420. In one embodiment, as discussed in FIG. 3, primary display area 330 is allocated to primary operating system 410 in a manner so that a standard sheet of paper (e.g., A4, etc.) can be displayed in primary display area 330 using aspect ratios appropriate to display the standard sheet of paper. In one embodiment, the width of the display, while in portrait mode, is 6.0 inches and the overall height of the display is 10.5 inches. Using this embodiment, primary display area 330 is configured by the hypervisor to be 8.5 inches in height with the remaining 2.0 inches (secondary display area 340) allocated to secondary operating system 420. As mentioned above, secondary operating system 420 can be either a guest operating system running under hypervisor 400 or a hypervisor process that runs separately from primary operating system 410.

Primary display area 330 either appears on top of secondary display area 340 or beneath secondary display area 340. Screen diagram 520 depicts the display running in portrait mode with the bottom portion of the display allocated to primary display area 330, while screen diagram 530 depicts the display running in portrait mode with the top portion of the display allocated to primary display area 330.

Many operating systems, such as Microsoft Windows™ operating systems, include a "task bar" that is used by a user to select currently running applications as well as including a "start" process used to start a new application. In one embodiment, this task bar is repositioned so that it is between primary display area 330 and secondary display area 340, according to user preference. For example, taking screen diagram 520, task bar 510 is either positioned on top of primary display area 330 (between primary display area 330 and secondary display area 340) or can be positioned at the bottom of the primary display area (not pictured in FIG. 5). Likewise, taking screen diagram 530, task bar 510 is either positioned beneath primary display area 330 (between primary display area 330 and secondary display area 340) or can be positioned at the top of the primary display area (not pictured in FIG. 5).

Figure 6:
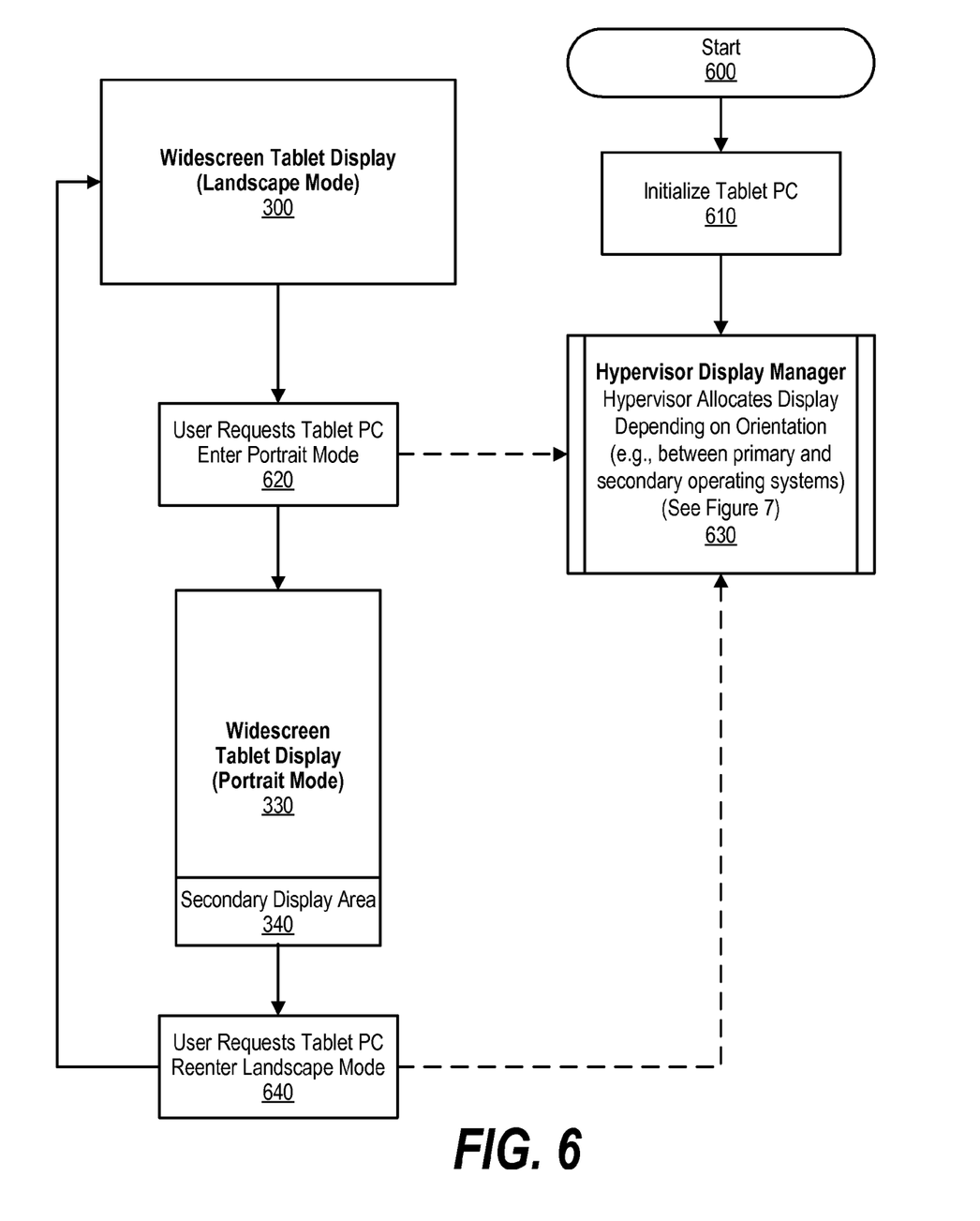
FIG. 6 is a high level flowchart showing steps performed when pivoting a widescreen tablet display into a portrait orientation.

FIG. 6 is a high level flowchart showing steps performed when pivoting a widescreen tablet display into a portrait orientation. Processing commences at 600 whereupon, at step 610, a tablet personal computer is initialized with its display initially oriented in landscape mode 300.

At some point, the user requests that the display be oriented into portrait mode (step 620). When this request is made, predefined process 630 operates in order to allocate the display between a primary operating system and a secondary operating system (a guest operating system or a hypervisor process, see FIG. 7 and corresponding text for processing details). The resulting widescreen display includes primary display area 330, used by the primary operating system, and secondary display area 340, used by the secondary operating system. In one embodiment, the hypervisor handles requests by the various operating system to display data and displays the data in the area allocated to the requesting operating system. If the user wishes to return to landscape mode, a request is made at step 640 and the hypervisor is used to return the display to landscape mode so that the display is used by the primary operating system and the secondary operating system no longer has an allocated display area (predefined process 630, see FIG. 7 and corresponding text for processing details).

Figure 7:
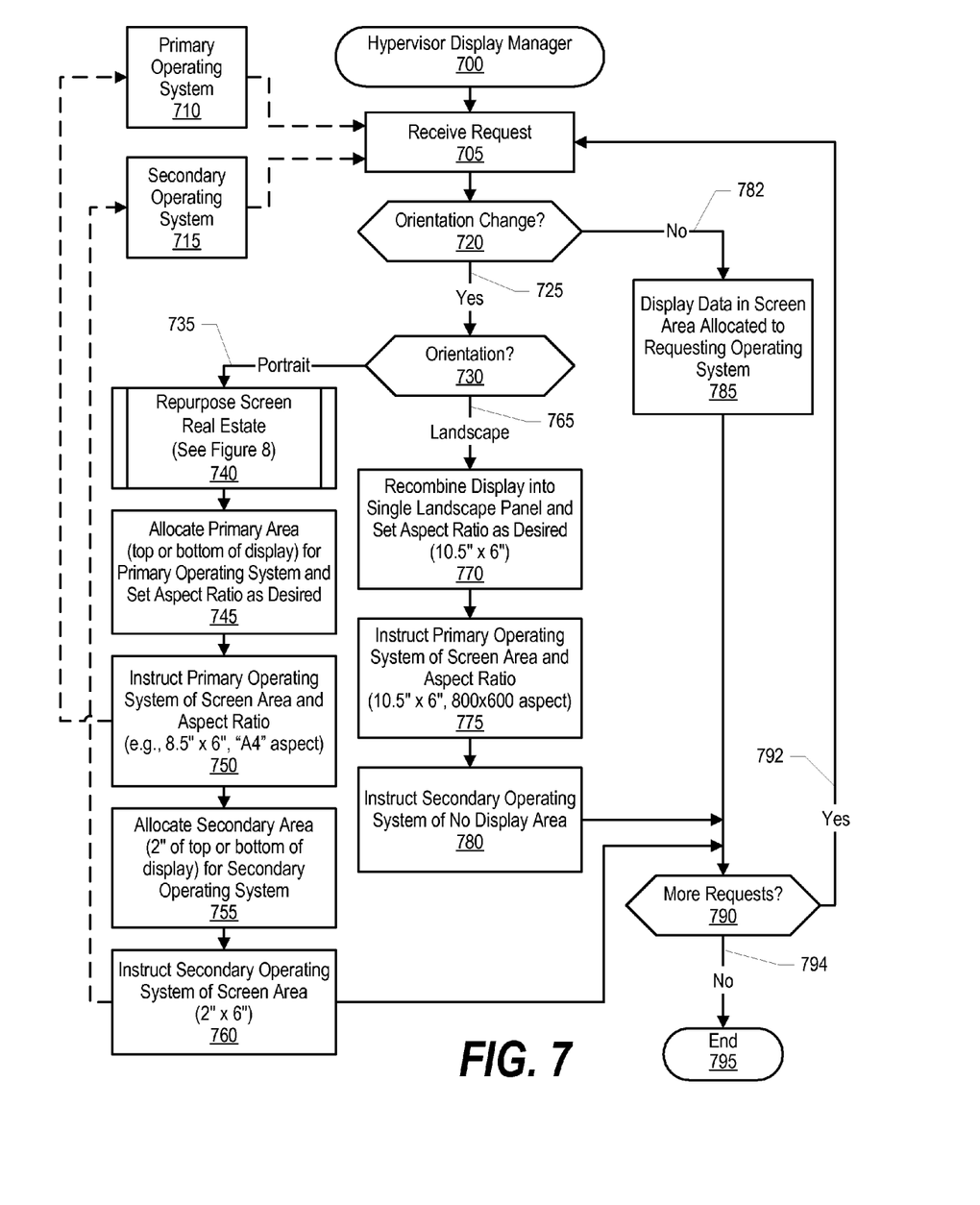
FIG. 7 is a flowchart showing steps taken by the hypervisor in managing the widescreen tablet display that is being used by two operating systems.

FIG. 7 is a flowchart showing steps taken by the hypervisor in managing the widescreen tablet display that is being used by two operating systems. Processing commences at 700 whereupon, at step 705, the hypervisor receives a request from primary operating system 710 or secondary operating system 715. In one embodiment, secondary operating system is a guest operating system running under the hypervisor, while in another embodiment, secondary operating system is a process that runs within the hypervisor itself but is separate and apart from the processes running in primary operating system 710.

A determination is made as to whether the request is a request for an orientation change, such as from landscape mode to portrait mode or from portrait mode back to landscape mode (decision 720). If the request is a request to change the display orientation, then decision 720 branches to "yes" branch 725 whereupon a determination is made as to whether the orientation is being changed to "portrait" mode or to "landscape" mode (decision 730). If the display is being oriented to "portrait" mode, then decision 730 branches to "portrait" branch 735 for portrait mode processing.

Figure 8:
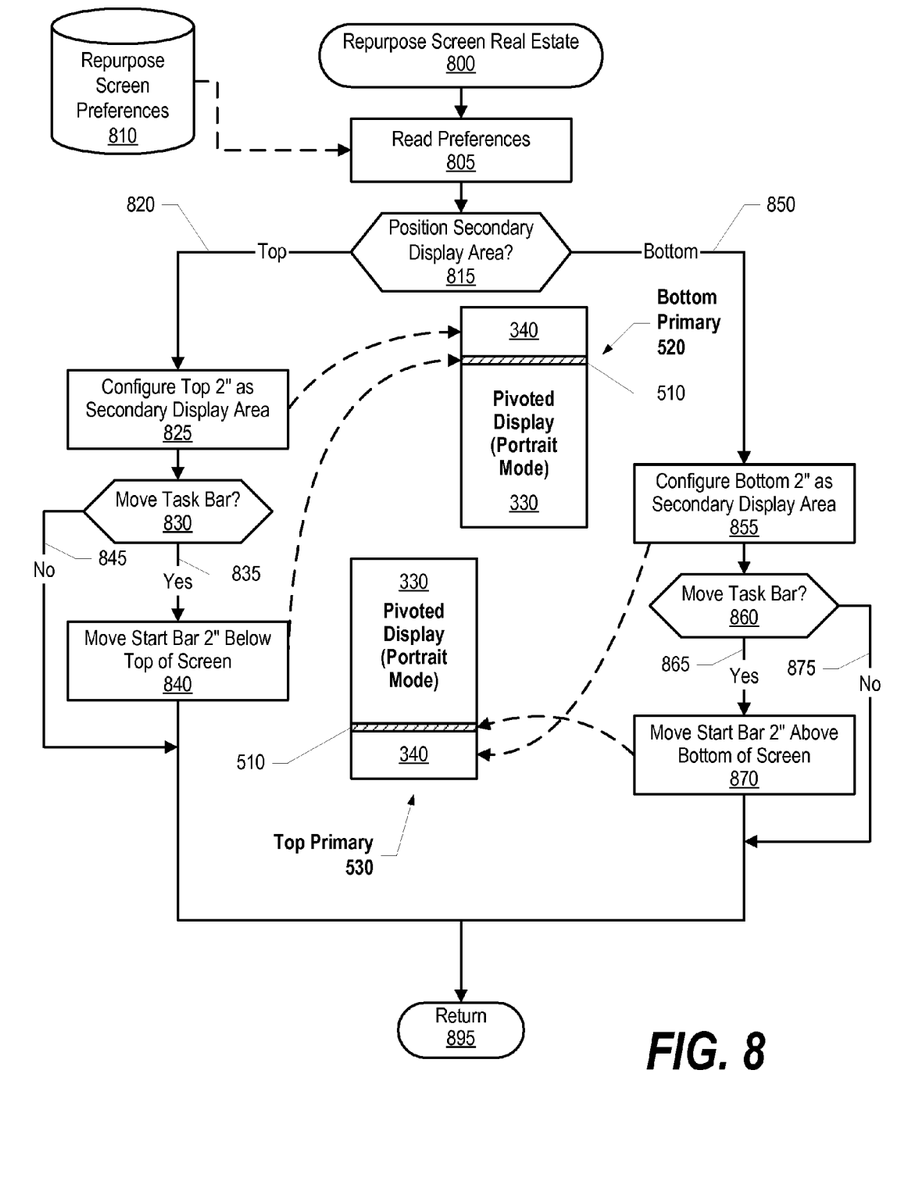
FIG. 8 is a flowchart showing steps taken by the hypervisor to repurpose the screen into two display areas when the screen is pivoted into a portrait orientation.

During portrait mode processing, the display is repurposed, based in part by user preferences, into a primary display area and a secondary display area (predefined process 740, see FIG. 8 and corresponding text for processing details). At step 745, the primary display area is allocated to the primary operating system and the aspect ratio of the primary display area is set. In one embodiment, the primary display area is set to a "paper-oriented" aspect ratio when the primary display area is oriented in portrait mode where the paper-oriented aspect ratio includes A4 paper size aspect ratio, 8½ by 11 inch aspect ratio and any other common paper-sized aspect ratios. At step 750, the hypervisor instructs the primary operating system as to the screen area that is now allocated to the primary operating system (e.g., 8.5 inches high by 6.0 inches wide) as well as the aspect ratio (e.g., a paper-oriented aspect ratio, etc.). Also during portrait mode processing, at step 755, the secondary display area is allocated to the secondary operating system and, at step 760, the hypervisor instructs the secondary operating system (e.g., a guest operating system running under the hypervisor or a process running in the hypervisor itself) as to the screen ara that is now allocated to the secondary operating system (e.g., 2.0 inches high by 6.0 inches wide). The hypervisor then checks if there are more display requests (decision 790).

Returning to decision 730, if the orientation of the display is being changed from portrait mode to landscape mode, then decision 730 branches to "landscape" branch 765 for landscape mode processing. At step 770, the display is recombined into a single display area (e.g., 10.5 inches wide by 6.0 inches high) and the aspect ratio is set to the aspect ratio that is used when the display is oriented in landscape mode (e.g., 800×600 pixels, 1024×768 pixels, 1600×1200 pixels, etc.). In a preferred embodiment, the aspect ratio used when the display is in a portrait orientation (the paper-oriented aspect ratio) is different from the aspect ratio used when the display is in the landscape orientation. At step 775, the primary operating system is instructed of its new screen area (the entire display area in landscape mode) as well as the aspect ratio that was set in step 770. At step 780, the secondary operating system is instructed that it no longer has a display area allocated to the secondary operating system.

Returning to decision 720, if the request was not an orientation request but was rather a display request, then decision 720 branches to "no" branch 782 whereupon, at step 785, the display request made by one of the operating systems is processed and the data is displayed in the display area allocated (if any) to the requesting operating system.

A determination is made as to whether there are additional display requests to process by the hypervisor (decision 790). So long as there are additional display requests received from one of the operating systems, then decision 790 branches to "yes" branch 792 which loops back to receive and process the display requests as described above. When there are no more display requests to process (e.g., the system is shutdown), then decision 790 branches to "no" branch 794 and processing ends at 795.

FIG. 8 is a flowchart showing steps taken by the hypervisor to repurpose the screen into two display areas when the screen is pivoted into a portrait orientation. Processing commences at 800 whereupon, at step 805, the user's screen preferences are read from repurpose screen preferences data store 810. A determination is made, based on the preferences or based on a default if no preference has been indicated, as to whether the secondary display area should be placed at the top of the display or at the bottom (decision 815).

If the secondary display area is positioned at the top of the display, then decision 815 branches to "top" branch 820 whereupon, at step 825, the top portion (e.g., 2.0 inches, etc.) of the display is configured for the secondary display area. Another determination is made, based on the user's preferences, as to whether to move task bar 510 for primary display area 330 to the top of the primary display area (decision 830). If the user (or default) preference is to move the task bar, then decision 830 branches to "yes" branch 835 whereupon, at step 840, the task bar is positioned to the top of primary display area 330 (e.g., 2.0 inches below the top of the overall screen, between primary display area 330 and secondary display area 340). On the other hand, if the task bar is not to be moved (e.g., the task bar is displayed at the bottom of primary display area 330), then decision 830 branches to "no" branch 845 bypassing step 840. Processing then returns to the calling process (see FIG. 7) at 895.

Returning to decision 815, if the secondary display area is positioned at the bottom of the display, then decision 815 branches to "bottom" branch 850 whereupon, at step 855, the bottom portion (e.g., 2.0 inches, etc.) of the display is configured for the secondary display area. Another determination is made, based on the user's preferences, as to whether to move task bar 510 for primary display area 330 to the bottom of the primary display area (decision 860). If the user (or default) preference is to move the task bar, then decision 860 branches to "yes" branch 865 whereupon, at step 870, the task bar is positioned to the bottom of primary display area 330 (e.g., 2.0 inches above the bottom of the overall screen, between primary display area 330 and secondary display area 340). On the other hand, if the task bar is not to be moved (e.g., the task bar is displayed at the top of primary display area 330), then decision 860 branches to "no" branch 875 bypassing step 870. Processing then returns to the calling process (see FIG. 7) at 895.

One of the preferred implementations of the invention is a client application, namely, a set of instructions (program code) or other functional descriptive material in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps. Functional descriptive material is information that imparts functionality to a machine. Functional descriptive material includes, but is not limited to, computer programs, instructions, rules, facts, definitions of computable functions, objects, and data structures.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method, comprising:
receiving a first pivot request to pivot first data displayed on a display screen from a landscape orientation to a portrait orientation, wherein a primary operating system displays the first data on the display screen;
in response to receiving the first pivot request, allocating, using a hypervisor, the display screen into a primary display area and a secondary display area below the primary area, displaying the first data originating from the primary operating system in the primary display area, and displaying second data originating from a second operating system in the secondary display area below the primary display area;
receiving a second pivot request to pivot from the portrait orientation to the landscape orientation; and
in response to receiving the second pivot request, de-allocating the secondary display area and reallocating the primary display area to at least substantially occupy an entire area of the display screen on which data is displayable.

2. The method of claim 1 further comprising:
sending a first instruction from the hypervisor to the primary operating system that informs the primary operating system of a first set of dimensions that correspond to the primary display area that is assigned to the primary operating system; and sending a second instruction from the hypervisor to the secondary operating system that informs the secondary operating system of a second set of dimensions that correspond to the secondary display area that is assigned to the secondary operating system, wherein the secondary operating system is at least one of a hypervisor routine and a hypervisor process, and wherein the secondary operation system does not comprise a guest operation system.

3. The method of claim 2 further comprising:
receiving, at the hypervisor, a first plurality of display requests from the primary operating system;
displaying, using the hypervisor, the first plurality of display requests on the primary display area;
receiving, at the hypervisor, a second plurality of display requests from the secondary operating system; and
displaying, using the hypervisor, the second plurality of display requests on the secondary display area.

4. the method of claim 1 further comprising:
after the allocating, repositioning a task bar utilized by the primary operating system based on user input so that the task bar is positioned between the primary and secondary display areas.

5. The method of claim 1 further comprising:
sending a first instruction from the hypervisor to the primary operating system that informs the primary operating system of a first set of dimensions that correspond to the reallocated primary display area; and
sending a second instruction from the hypervisor to the secondary operating system that informs the secondary operating system that no display area is assigned to the secondary operating system.

6. The method of claim 1 further comprising:
after allocating the display screen into the primary display area and the secondary display area, setting an aspect ratio of the primary display area to a paper-oriented aspect ratio.

7. An information handling system comprising:
at least one processor;
a display screen accessible to the processor; and
a memory accessible to the processor and bearing instructions executable by the processor to:
receive a first pivot request to pivot first data displayed on the display screen from a landscape orientation to a portrait orientation, wherein a primary operating system displays the first data on the display screen;
in response to receipt of the first pivot request, allocate the display screen into a primary display area and a secondary display area, display the first data originating from the primary operating system in the primary display area, and display second data originating from a second operating system in the secondary display area;
receive a second pivot request to pivot from the portrait orientation to the landscape orientation; and
in response to receipt of the second pivot request, de-allocate the secondary display area and reallocate the primary display area to at least substantial occupy an entire area of the display screen on which data is displayable.

8. The information handling system of claim 7, wherein a hypervisor executed by the processor performs the allocation.

9. The information handling system of claim 8 wherein the instructions are executable to:
send a first instruction from the hypervisor to the primary operating system that informs the primary operating system of a first set of dimensions that correspond to the primary display area that is assigned to the primary operating system; and
send a second instruction from the hypervisor to the secondary operating system that informs the secondary operating system of a second set of dimensions that correspond to the secondary display area that is assigned to the secondary operating system, wherein the secondary operating system does not comprise a guest operating system.

10. The information handing system of claim 9 wherein the instructions are executable to:
receive, at the hypervisor, a first plurality of display requests from the primary operating system;
display, using the hypervisor, the first plurality of display requests on the primary display area;
receive, at the hypervisor, a second plurality of display requests from the secondary operating system; and
display, using the hypervisor, the second plurality of display requests on the secondary display area.

11. The information handling system of Claim 8 wherein the instructions are executable to:
after the allocation, reposition a task bar utilized by the primary operating system based on user input so that the task bar is positioned between the primary and secondary display areas.

12. The information handling system of claim 8 wherein the instructions are executable to:

send a first instruction from the hypervisor to the primary operating system that informs the primary operating system of a first set of dimensions that correspond to the reallocated primary display area; and send a second instruction from the hypervisor to the secondary operating system that informs the secondary operating system that no display area is assigned to the secondary operating system.

13. The information handling system of claim 7 wherein the instructions are executable to:

after allocation of the display screen into the primary display area and the secondary display area, set an aspect ratio of the primary display area to a paper-oriented aspect ratio.

14. A computer readable storage medium that is not a transitory signal, the computer readable storage medium comprising instructions executable by a processor:

receive a first pivot request to pivot first data displayed on a display screen from a landscape orientation to a portrait orientation, wherein a primary operating system displays the first data on the display screen;

in response to receipt of the first pivot request, allocate the display screen into a primary display area and a secondary display area, display the first data originating from the primary operating system in the primary display area, and display second data originating from a second operating system in the secondary display area;

receive a second pivot request to pivot from the portrait orientation to the landscape orientation; and in response to receipt of the second pivot request, de-allocate the secondary display area and reallocate the primary display area to at least substantially occupy an entire area of the display screen on which data is displayable.

15. The computer readable storage medium of claim 14, wherein a hypervisor performs the allocation, wherein the primary display area is below the secondary display area when the primary display area and secondary display area are viewed upright when presented in the portrait orientation, and wherein the juxtaposition of the primary display area below the secondary display based on use input.

16. The computer readable storage medium of claim 15, wherein the instructions are executable to:

send a first instruction from the hypervisor to the primary operating system that informs the primary operating system of a first set of dimensions that correspond to the primary display area that is assigned to the primary operating system; and send a second instruction from the hypervisor to the secondary operating system that informs the secondary operating system of a second set of dimension that correspond to the secondary display area that is assigned to the secondary operating system.

17. The computer readable storage medium of claim 16, wherein the instructions are executable to:

receive, at the hypervisor, a first plurality of display requests from the primary operating system;

display, using the hypervisor, the first plurality of display requests on the primary display area;

receive, at the hypervisor, a second plurality of display request from the secondary operating system; and display, using the hypervisor, the second plurality of display requests on the secondary display area.

18. The computer readable storage medium of claim 15, wherein the instructions are executable to:

after the allocation, reposition a task bar utilized by the primary operating system based on user input so that the task bar is positioned between the primary and secondary display areas.

19. The computer readable storage medium of claim 15, wherein the instructions are executable to:

send a first instruction from the hypervisor to the primary operating system that informs the primary operating system of a first set of dimensions that correspond to the reallocated primary display area; and send a second instruction from the hypervisor to the secondary operating system that informs the secondary operating system that no display area is assigned to the secondary operating system.

* * * * *